J. FRIE.
NON-SKID TIRE CHAIN.
APPLICATION FILED JULY 20, 1918.

1,318,064.

Patented Oct. 7, 1919.

Inventor:
J. Frie
By E. E. Troomans Co.,
his Att'ys.

UNITED STATES PATENT OFFICE.

JOSEPH FRIE, OF FOUNTAIN CITY, WISCONSIN.

NON-SKID TIRE-CHAIN.

1,318,064.

Specification of Letters Patent.

Patented Oct. 7, 1919.

Application filed July 20, 1918. Serial No. 245,884.

*To all whom it may concern:*

Be it known that I, JOSEPH FRIE, a citizen of the United States of America, residing at Fountain City, in the county of Buffalo and State of Wisconsin, have invented certain new and useful Improvements in Non-Skid Tire-Chains, of which the following is a specification, reference being had therein to the accompanying drawing.

This invention relates to a non-skid tire chain and has for its principal object the production of simple and efficient means for holding the chain around a tire.

Another object of this invention is the production of a lock for holding the chain around an automobile tire, which lock may be easily attached and detached.

A still further object of this invention is in the production of a lock which is adapted to be sprung into engagement with the end links of a chain.

With these and other objects in view this invention consists in general of certain novel combinations, constructions and arrangements of parts as will be hereinafter fully described and claimed.

Figure 1:
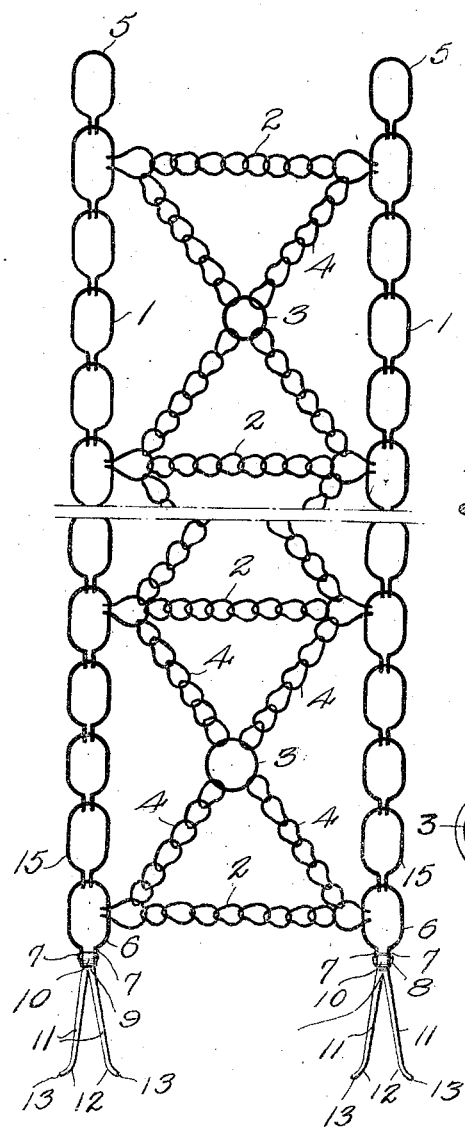
Figure 1 is a fragmentary plan view of the tire chain.
Figure 4:
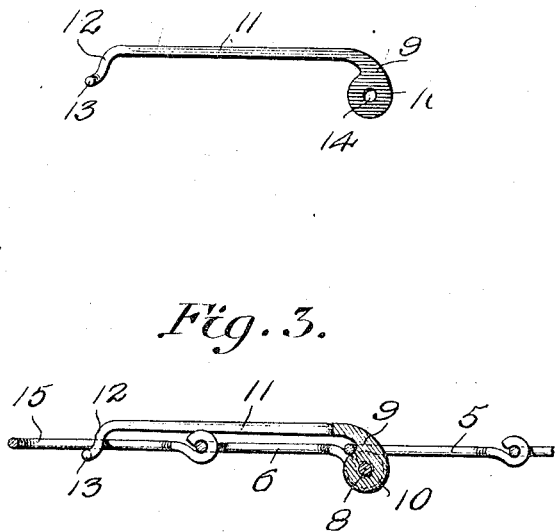
Fig. 4 is a side elevation of the latch used in connection with this device.

By referring to the accompanying drawing by numerals it will be seen that this device consists of the outer chains 1 which are connected by means of the transverse chains 2. These transverse chains 2 are connected by means of the circular link 3 and the radiating chain arms 4. The side chains 1 are provided with the end links 5 and the lock-carrying links 6.

The lock-carrying links 6 are provided with the eyes 7 which receive the rivets 8 so as to hold the latch 9 in engagement therewith. This latch 9 consists of the cylindrically-shaped body-portion 10, which body-portion is provided with the divergingly-extending arms 11. The arms 11 terminate in the depending fingers 12, which depending fingers 12 are bent outwardly so as to diverge from one another thereby forming the gripping ends 13.

The body-portion 10 of the latch 9 is provided with the central bore 14 through which passes the rivet 8.

Figure 3:
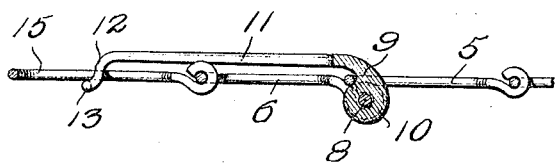
Fig. 3 is a section taken on the line 3—3, Fig. 2.
Figure 2:
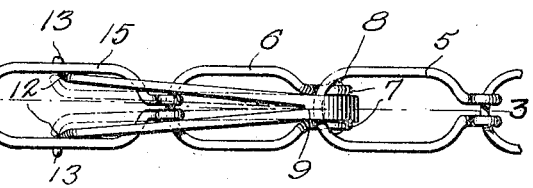
Fig. 2 is an enlarged detail view of the locking means.

It will be seen by referring especially to Fig. 3, that the latch 9 is pivotally mounted upon the latch-carrying link 6 and is passed through the end link 5 so that the arms 11 will extend parallel with the link 6. By referring especially to Fig. 2, it will be seen that the diverging arms 11 are sprung toward one another so as to allow the fingers 12 to pass within the opening provided within the link 15 which is carried adjacent the link 6 whereby the gripping ends 13 of the fingers 12 will engage the side portions of the link 15 thereby holding the latch 9 in a locked position since the arms will normally spring away from each other so as to engage the side portions of the link 15.

When it is desired to detach the chain from the automobile tire it will be seen that this may be done very quickly and efficiently since all that is necessary is to press the two arms 11 toward one another so as to allow the gripping ends 13 to be free of the side portions of the link 15, and the strain upon the chain will normally throw the latch out of engagement with said link 15. This is clearly shown in Fig. 3.

From the above description it will be seen that a simple and efficient device has been produced whereby the chain may be quickly placed upon a tire and locked thereon. It will also be seen that a lock has been produced which is cheap of construction, and only consists in one member that is in any way different from the usual elements in a non-skid chain, namely the latch 9. It will be seen that this latch 9 may be placed upon the usual non-skid chain in such a manner that the same will engage the links carried thereon.

What is claimed is:—

1. As a new article of manufacture, a latch of the class described comprising a cylindrical body portion, a central bore provided within said body portion, diverging arms extending from said body portion, depending fingers carried upon the end portions of said arms and terminating in divergently-extending gripping ends carried upon the ends of said fingers, and said gripping ends extending outwardly at an angle to said depending fingers.

2. As a new article of manufacture, a latch of the class described comprising a single piece of resilient metal, said latch comprising a cylindrical body portion, said body portion being provided with a central bore, diverging arms extending from said body portion, depending integral fingers extending at an angle from said arms, and gripping ends extending at an angle from said fingers so as to diverge from one another.

In testimony whereof I hereunto affix my signature.

JOSEPH FRIE.